(12) United States Patent
Mano et al.

(10) Patent No.: US 11,641,315 B2
(45) Date of Patent: May 2, 2023

(54) TRAFFIC MONITORING METHOD, TRAFFIC MONITORING DEVICE, AND PROGRAM

(71) Applicant: NIPPON TELEGRAPH AND TELEPHONE CORPORATION, Tokyo (JP)

(72) Inventors: Toru Mano, Musashino (JP); Hitoshi Masutani, Musashino (JP); Junki Ichikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 166 days.

(21) Appl. No.: 17/295,483

(22) PCT Filed: Nov. 13, 2019

(86) PCT No.: PCT/JP2019/044525
§ 371 (c)(1),
(2) Date: May 20, 2021

(87) PCT Pub. No.: WO2020/110725
PCT Pub. Date: Jun. 4, 2020

(65) Prior Publication Data
US 2022/0006713 A1    Jan. 6, 2022

(30) Foreign Application Priority Data
Nov. 27, 2018  (JP) .............................. JP2018-221323

(51) Int. Cl.
*H04L 12/26*    (2006.01)
*H04L 12/24*    (2006.01)
(Continued)

(52) U.S. Cl.
CPC .......... *H04L 43/062* (2013.01); *H04L 41/142* (2013.01)

(58) Field of Classification Search
CPC ...... H04L 43/062; H04L 41/142; H04L 43/04
See application file for complete search history.

(56) References Cited

U.S. PATENT DOCUMENTS

| 8,769,067 B2 * | 7/2014 | Raja ........................ H04L 49/90 713/400 |
| 2018/0270156 A1 * | 9/2018 | Keith .................. H04L 47/2483 |
| 2019/0068512 A1 * | 2/2019 | Papaloukopoulos ... H04L 45/00 |

FOREIGN PATENT DOCUMENTS

CN  107832149 A  *  3/2018  ............. G06F 9/505

OTHER PUBLICATIONS

Intel Corporation, Intel® 82576EB Gigabit Ethernet Controller Datasheet, literature, Dec. 2011, https://www.intel.com/content/dam/www/public/us/en/documents/datasheets/82576eb-gigabit-ethernet-controller-datasheet.pdf.

(Continued)

*Primary Examiner* — Schquita D Goodwin (57) ABSTRACT

An object is to provide a traffic monitoring method, a traffic monitoring apparatus, and a program capable of efficiently merging data structures of each of the cores in a multi-core environment without reconstructing a data structure, retrieving a data structure, and adjusting the RSS function. In the traffic monitoring method according to an embodiment of the present invention, the elements of the data structures formed in the cores are compared for each item, and statistic values in the elements are brought together into any one of the elements, and the statistic values of the other elements are set to zero. Redundant elements between the data structures can be removed by ignoring elements having a statistic value of zero at the time of merging data structures.

8 Claims, 8 Drawing Sheets

(51) Int. Cl.
*H04L 43/062* (2022.01)
*H04L 41/142* (2022.01)

(56) References Cited

OTHER PUBLICATIONS

Pat Morin, Open Data Structures, Publication, 2013, http://www.aupress.ca/index.php/books/120226.

\* cited by examiner

TRAFFIC MONITORING METHOD, TRAFFIC MONITORING DEVICE, AND PROGRAM

CROSS-REFERENCE TO RELATED APPLICATIONS

This application is a 371 U.S. National Phase of International Application No. PCT/JP2019/044525 filed on Nov. 13, 2019, which claims priority to Japanese Application No. 2018-221323 filed on Nov. 27, 2018. The entire disclosures of the above applications are incorporated herein by reference.

TECHNICAL FIELD

The present disclosure relates to a method, apparatus, and program for traffic monitoring operating on a general-purpose CPU and a general-purpose NIC.

BACKGROUND ART

In an IP network, traffic monitoring is a necessary technique for daily management, operation, and billing, and is an important task of providing necessary information for facility planning, accommodation design, traffic engineering, and security handling.

Dedicated hardware has been used for high-speed, high-precision, and real-time monitoring applications. However, there is a problem that dedicated hardware is expensive and thus it is difficult to add observation points freely. On the other hand, monitoring may be implemented in software using a general-purpose CPU and a general-purpose NIC. When a general-purpose CPU and a general-purpose NIC are used, the cost can be reduced, so that observation points can be provided in a large number of locations for monitoring, or a monitoring point can be installed as necessary. However, packet processing performance by software is lower than that by dedicated hardware. Thus, improvement of performance by multiple cores composed of a plurality of CPUs is being examined.

When traffic monitoring is performed by multiple cores, the following two points are required to exhibit performance.
1. A receive side scaling (RSS) (see, for example, Non Patent Literature 1) is enabled by the NIC to evenly distribute a traffic to each core.
2. Each core is made to operate independently (when there is interaction between cores, performance is reduced due to need for synchronization processing).

CITATION LIST

Non Patent Literature

Non Patent Literature 1: Intel (trade name) 82576EB Gigabit Ethernet Controller Datasheet, https://www.intel.com/content/dam/www/public/us/en/documents/datasheets/82576eb-gigabit-ethernet-controller-datasheet.pdf (searched on Nov. 6, 2018)

Non Patent Literature 2: Pat Morin, "Open Data Structures", AU Press Athabasca University, 2013, http://www.au-press.ca/index.php/books/120226 (searched on Nov. 6, 2018)

SUMMARY OF THE INVENTION

Technical Problem

However, when traffic monitoring is performed by multiple cores, the same observation item may be sorted into separate cores by observation granularity setting. Here, the observation granularity is a unit of aggregation and, for example, corresponds to an IP pair or destination IP in an observation task such as "measuring a communication traffic per IP pair" or "measuring a communication traffic per destination IP".

Figure 1:
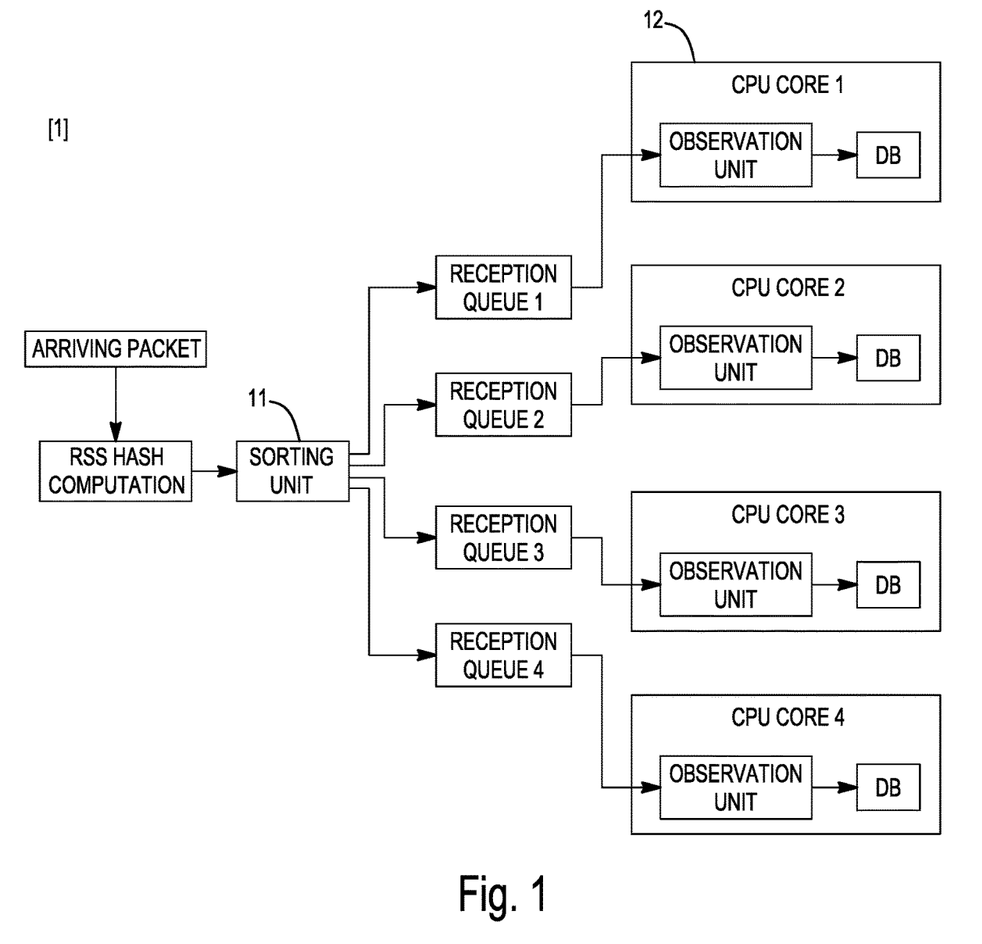
FIG. 1 is a diagram illustrating an apparatus for performing a traffic monitoring by multiple cores.

This is, for example, a case where a header to be computed (e.g., IPv6 pair) is different from the observation granularity (e.g., only beginning 64 bits of a source IPv6) in the RSS. Here, the RSS is a function of computing a hash value from a specified bit sequence of a packet header and sorting packets into CPU cores in accordance with the hash value (FIG. 1).

This may not result in a correct value of an observed value of an item. For example, when a hash value is computed for an IP pair in the RSS and a communication traffic is observed for each destination IP as an item, packets with the same destination IP may be assigned to separate cores. Thus, when it is observed whether a communication traffic exceeds a threshold value, only a value that is less than the actual communication traffic can be observed in each core, which may lead to erroneous threshold determination.

Furthermore, when traffic monitoring by software is performed in a plurality of cores, there is a need to merge a plurality of data structures constructed in the respective cores at high speed (elimination of redundant elements). There are three methods for eliminating redundant elements from a plurality of data structures as described below.
Method 1. A method in which a single large data structure is reconstructed using each element of data structure constructed by observation in each core as input
Method 2. A method in which a hash value of the RSS is adjusted to assign an identical key to an identical CPU core
Method 3. A method in which each data structure is retrieved for all elements to delete redundant elements The problems of each of the methods will be described below.

Problems of Method 1

The method 1 has the problem that additional space complexity and time complexity are required because a data structure is reconstructed.

For example, if a set is implemented with a tree structure (see, for example, Non Patent Literature 2) to eliminate redundancy, computational complexity of $O(T \log T)$ is required to reconstruct the data structure. Here, T is the sum of the number of elements observed in each core.

Also, as another example, if the data structure utilizes a hash table (see, for example, Non Patent Literature 2), for each element of the hash table constructed by observation in each core, a hash value needs to be computed again and inserted into a new hash table. Thus, work such as memory securement for the new hash table is required in addition to recalculating hash values.

Problem of Method 2

The RSS is the function of the NIC, and the hash value of the RSS is computed by hardware. The method 2 has two problems.

One of the problems is a need to make the RSS function correspond to the observation granularity. As the observation granularity, the following is considered.
(1) Source IP
(2) Destination IP
(3) Combination of higher 24 bits of source IP and higher 24 bits of destination IP
(4) Source IP, destination IP, protocol number, source port, destination port
(5) Packet length For example, for the packet length of (5), the packet length needs to be included in the RSS computation. However, the RSS computation is commonly performed up to L4 port number (port number of TCP or UDP), and the packet length is not usually supported as the RSS function.

The other one of the problems is that when observation is performed at a plurality of observation granularities, a packet is assigned to another core depending on the observation granularities.

Figure 3:
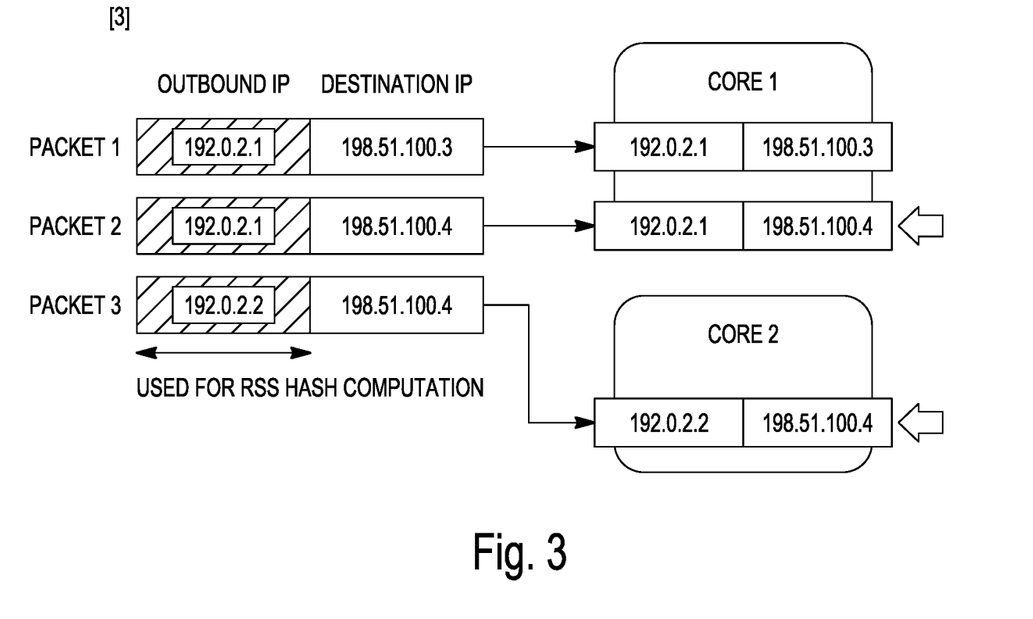
FIG. 3 is a diagram illustrating a problem of the present invention.
Figure 4:
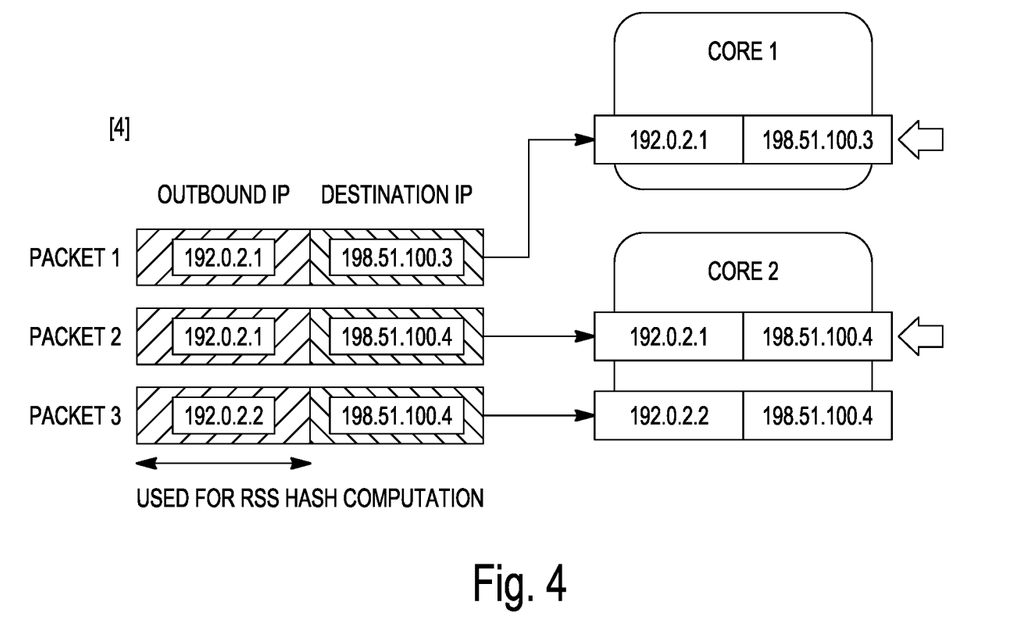
FIG. 4 is a diagram illustrating a problem of the present invention.

For example, consider a case where the above (1) and (2) are observed. FIGS. 3 and 4 are diagrams each illustrating a relationship between an RSS computation field and an observation granularity. As illustrated in FIG. 4, when a source IP and a destination IP are used for the RSS computation, even if packets have the same source IP, the packets with different destination IPs may be assigned to different cores, and thus will not fit the observation granularity in (1). On the other hand, as illustrated in FIG. 3, when only the source IP is used for the RSS computation, even if packets have the same destination IP, the packets with different source IPs may be assigned to different cores, and thus will not fit the observation granularity in (2). The same applies to a case where only the destination IP is used for the RSS computation.

Problems of Method 3

Method 3 is a method for retrieving and merging redundant elements from the data structure of each core for all elements. Thus, the method 3 has a problem that an additional computation time is required because the retrieval operation is performed on each element and each data structure and merging also needs to be performed.

For example, consider a case where a tree structure is used to utilize a set, for the data structure. The retrieval requires computational complexity of O(log N), where N is the number of elements in the set. Here, the number of elements of the data structure of an i-th core is defined as $|T^i|$. If the retrieval can be performed for all data structures in parallel, computational complexity of $O(Tmax_i \log|T^i|)$ is required. If the retrieval cannot be performed in parallel, the computational complexity of Expression 1 is required.

[Math. 1]

$$O(T\Sigma_{i=1}^{n} \log|T^i|) \quad \text{(Expression 1)}$$

Where T is the sum of the numbers of elements observed in cores and

[Math. 2]

$$T=\Sigma_{i=1}^{n}|T^i| \quad \text{(Equation 2)}$$

is established.

Also, for example, if a hash table is utilized in the data structure, it is necessary to recompute the hash values for all of the elements in the same manner as reconstruction. Further, if hash functions used are different for respective cores, the hash values need to be recomputed by the number of different hash functions because the corresponding hash functions need to be used.

An object of the present invention is to solve the problems of the methods 1 to 3 described above. That is, in order to solve the problems described above, the present invention is directed to providing a traffic monitoring method, a traffic monitoring apparatus, and a program, which can efficiently merge data structures of each of the cores in a multi-core environment without reconstructing a data structure, retrieving a data structure, and adjusting an RSS function.

Means for Solving the Problem

In order to achieve the above object, the traffic monitoring method according to an embodiment of the present invention compares the elements of data structures formed by cores for each item, brings statistic values in the elements together into any one of the elements, and makes the statistic values of the other elements zero.

Specifically, the traffic monitoring method according to an embodiment of the present invention is a traffic monitoring method in a multi-core environment, the traffic monitoring method including sorting packets into a plurality of cores with a receive side scaling (RSS) function, in each of the plurality of cores, every predetermined time, observing the packets for items to obtain statistic values and forming a data structure composed of elements, each of the elements being composed of a combination of each of the items and each of the statistic values, and comparing the elements composing the data structure formed in each of the plurality of cores for each of the items, rewriting a statistic value of the statistic values composing an element of the elements of any one of the plurality of cores to a value depending on a purpose of the statistic value for each of the items, replacing the statistic values composing the elements of other ones of the plurality of cores with zero, and merging a plurality of the data structures of the plurality of cores.

The traffic monitoring apparatus according to an embodiment of the present invention is a multi-core traffic monitoring apparatus including a sorting unit configured to sort packets in plural with a receive side scaling (RSS) function, a plurality of cores configured to receive the packets sorted by the sorting unit, observe the packets for items every predetermined time to obtain statistic values, and form a data structure composed of elements, each of the elements being composed of a combination of each of the items and each of the statistic values, and a merging unit configured to compare the elements composing the data structure formed in each of the plurality of cores for each of the items, rewrite a statistic value of the statistic values composing an element of the elements of any one of the plurality of cores to a value depending on a purpose of the statistic value for each of the items, replace the statistic values composing the elements of other ones of the plurality of cores with zero, and merge a plurality of the data structures of the plurality of cores.

As in the present invention, when the statistic values of the elements of the data structures are processed and the elements the statistic values of which are zero are ignored when the data structures are merged, the redundant elements between the data structures can be removed. Accordingly, the present invention can provide a traffic monitoring method and a traffic monitoring apparatus that can efficiently merge data structures of each of the cores in a multi-core environment without reconstructing a data structure, retrieving a data structure, and adjusting an RSS function.

Note that values as described below can be used for the statistic value.

(1) The statistic value composing the element is the number of occurrences of each of the packets corresponding to each of the items of the element, and the value depending on the purpose of the statistic value is sum of the statistic values composing the elements of all the plurality of cores.
(2) The statistic value composing the element is a packet length of each of the packets corresponding to each of the items of the element, and the value depending on the purpose of the statistic value is sum of the statistic values composing the elements of all the plurality of cores.
(3) The statistic value composing the element is a maximum packet length of each of the packets corresponding to each of the items of the element, and the value depending on the purpose of the statistic value is a maximum value among the statistic values composing the elements of all the plurality of cores.
(4) The statistic value composing the element is a minimum packet length of each of the packets corresponding to each of the items of the element, and the value depending on the purpose of the statistic value is a minimum value among the statistic values composing the elements of all the plurality of cores.

In the traffic monitoring method according to an embodiment of the present invention, preferably, at the predetermined time, the forming of the data structure is performed in one database of each of the plurality of cores and each of the plurality of the data structures where the merging is performed is stored in another database of each of the plurality of cores.

The present traffic monitoring method can periodically perform a merging step to prevent new data from being recorded after the data structure has been merged.

A program according to an embodiment of the present invention is a program for causing a computer to execute the above-described traffic monitoring method.

The traffic monitoring method according to an embodiment of the present invention can also be implemented by a computer and a program. The program can be recorded in a recording medium and provided through a network.

The inventions described above can be combined with each other as far as possible.

Effects of the Invention

The present invention can provide a traffic monitoring method, a traffic monitoring apparatus, and a program that can efficiently merge data structures of each of the cores in a multi-core environment without reconstructing a data structure, retrieving a data structure, and adjusting an RSS function.

DESCRIPTION OF EMBODIMENTS

Hereinafter, an embodiment of the present invention will be described with reference to the drawings. The embodiment to be described below are examples of the present invention, and the present invention is not limited to the following embodiment. In this specification and the drawings, it is assumed that constituent elements having the identical reference signs are identical.

Figure 2:
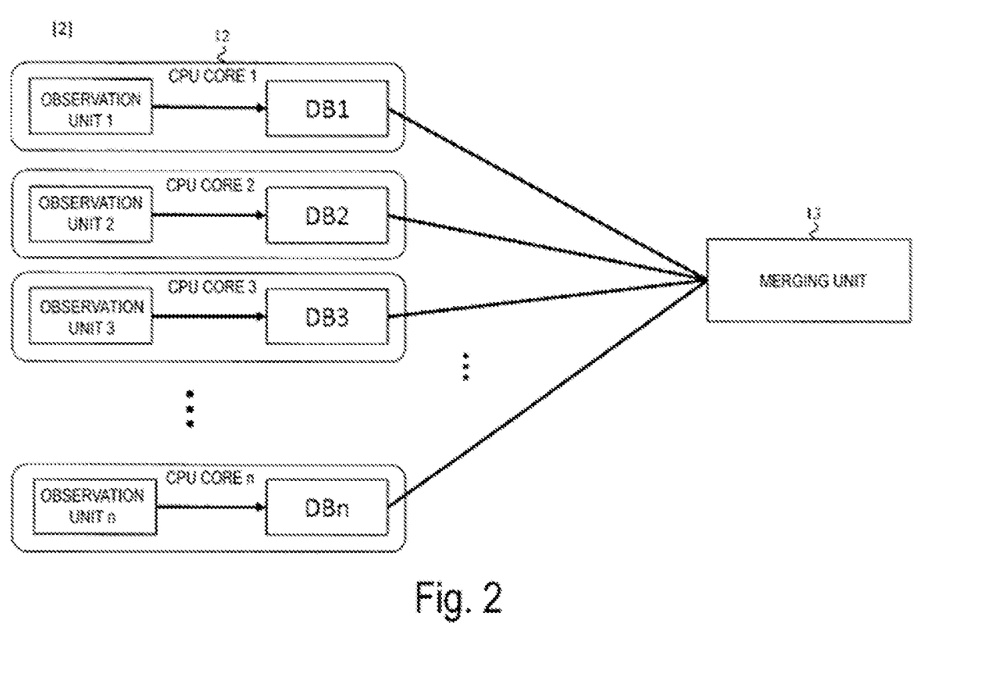
FIG. 2 is a diagram illustrating a traffic monitoring apparatus according to an embodiment of the present invention.

FIGS. 1 and 2 are diagrams illustrating a traffic monitoring apparatus according to the present embodiment. The traffic monitoring apparatus includes a sorting unit 11 configured to sort packets in plural with a receive side scaling (RSS) function, a plurality of cores 12 configured to receive the packets sorted by the sorting unit 11, observe the packets for items every predetermined time to obtain statistic values, and form a data structure composed of elements, each of the elements being composed of a combination of each of the items and each of the statistic values, and a merging unit 13 configured to compare the elements composing the data structure formed in each of the plurality of cores 12 for each of the items, rewrite a statistic value of the statistic values composing an element of the elements of any one of the plurality of cores to a value depending on a purpose of the statistic value for each of the items, replace the statistic values composing the elements of other ones of the plurality of cores with zero, and merge a plurality of the data structures of the plurality of cores 12.

Figure 12:
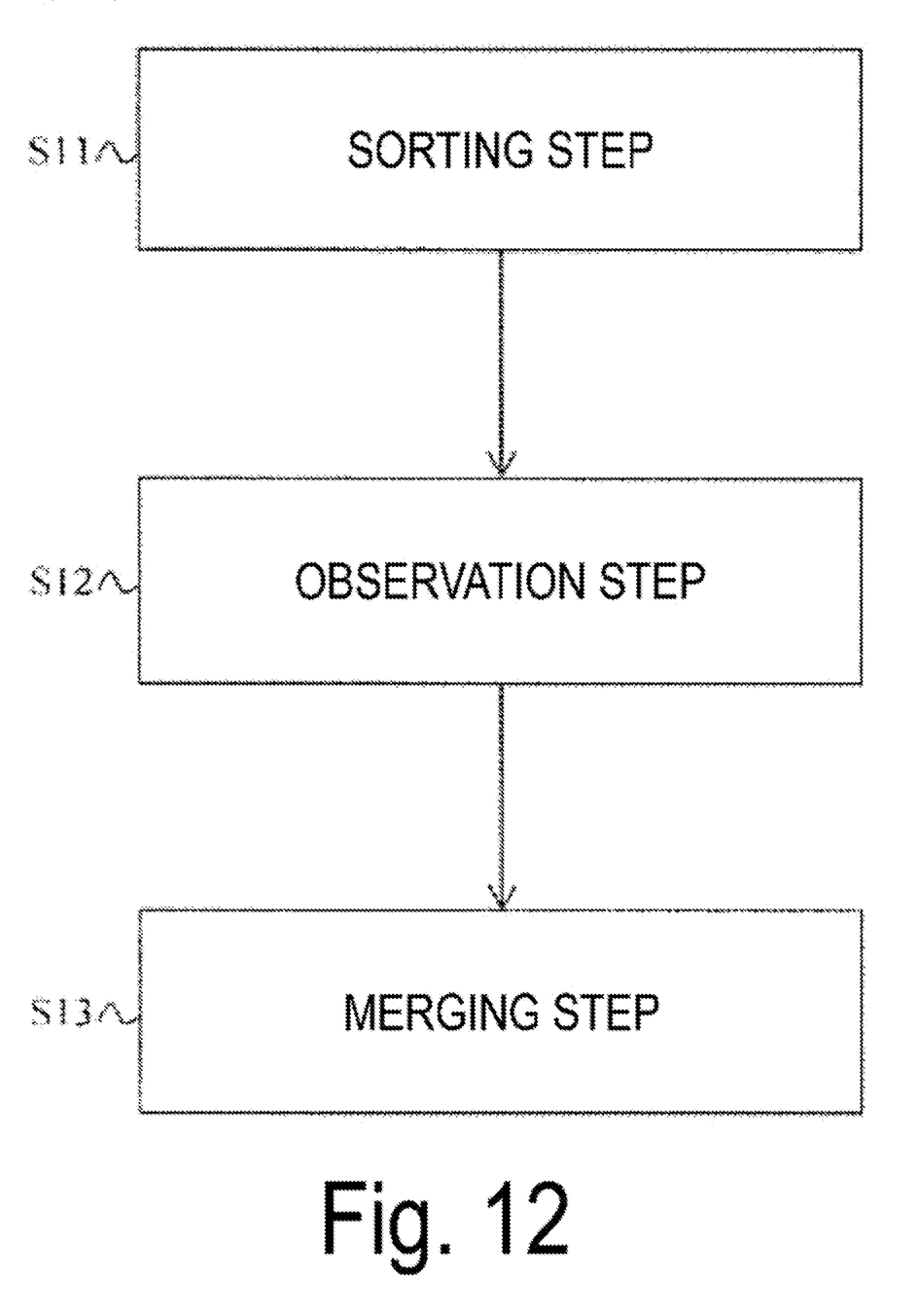
FIG. 12 is a flowchart illustrating a traffic monitoring method according to an embodiment of the present invention.

FIG. 12 is a flowchart illustrating a traffic monitoring method performed by the traffic monitoring apparatus according to the present embodiment. The present traffic monitoring method includes a sorting step S11 of sorting packets into a plurality of cores with a receive side scaling (RSS) function, in each of the plurality of cores, every predetermined time, an observation step S12 of observing the packets for items to obtain statistic values and forming a data structure composed of elements, each of the elements being composed of a combination of each of the items and each of the statistic values, and a merging step S13 of comparing the elements composing the data structure formed in each of the plurality of cores for each of the items, rewriting a statistic value of the statistic values composing an element of the elements of any one of the plurality of cores to a value depending on a purpose of the statistic value for each of the items, replacing the statistic values composing the elements of other ones of the plurality of cores with zero, and merging a plurality of the data structures of the plurality of cores.

The present embodiment will be explained using, as an example, the fact that the statistic value of the elements is the number of occurrences of the packet corresponding to the item of the element, and the value depending on the purpose of the statistic value in the merging step is the sum of the statistic values of the elements of all the cores. Specifically, it will be explained using the fact that the number of occurrences for each observation granularity (item) is measured every t seconds as an observation task.

Note that it is possible to handle the total number of bytes of item, the maximum packet length, the minimum packet length, and other observed values as the statistic value. When the maximum packet length or the minimum packet length is observed, it can be similarly handled by replacing the sum $\Sigma$ in Step 8 described below with max or min.

In addition, the traffic monitoring apparatus of the present embodiment operates to form a data structure in one database of the core in the observation step S12 at a predetermined time (t seconds), and operates to merge a data structure stored in the other database of the core in the merging step S13.

Figure 10:
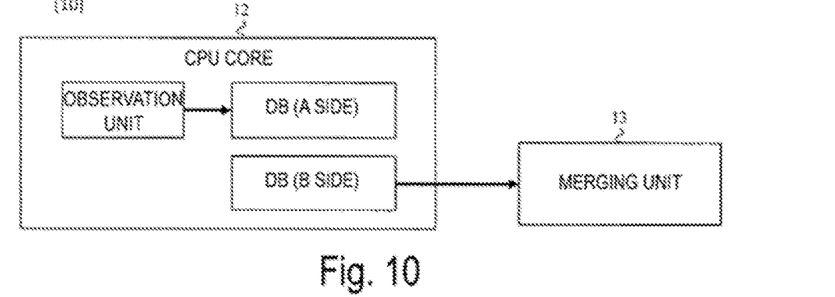
FIG. 10 is a diagram illustrating a core of the traffic monitoring apparatus according to an embodiment of the present invention.
Figure 11:
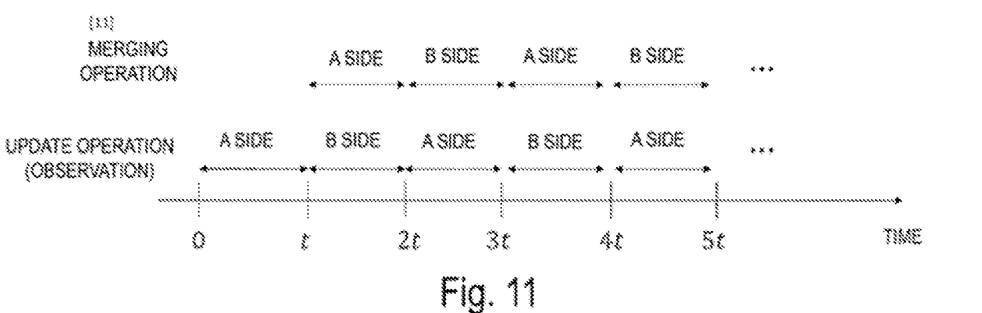
FIG. 11 is a diagram illustrating an operation of a traffic monitoring apparatus according to an embodiment of the present invention.

FIG. 10 is a diagram illustrating the structure of the core 12. Each core 12 includes two databases that record data structures. For example, the databases are defined as an A side and a B side. FIG. 11 is a diagram illustrating an operation of the core 12 and the merging unit 13 as illustrated in FIG. 10. The core 12 records an observation result from 0 seconds to t seconds in the A side. The core 12 then records an observation result from t seconds to 2t seconds in the B side. In this manner, the core 12 exchanges data structures to be recorded every t seconds. Then, the merging unit 13 merges the data structure on the A side between t seconds and 2t seconds, and merges the data structure on the B side between 2t seconds and 3t seconds. In this way, the data structure to be merged every t seconds is exchanged so that new data is not recorded after merging.

FIGS. 5 to 9 are diagrams illustrating operations of the present traffic monitoring apparatus. The data structure observed by an i-th core 12 is referred to as a list $T^i$. The list $T^i$ includes a plurality of elements x. The elements x each are represented by a pair of an item $a_j$ (which is a destination address in the present embodiment) and the number $f_j$ of occurrences of a packet corresponding to the item. j is a reference sign identifying an item.

[Math. 3]

$$x=(a_j, f_j) \tag{Equation 3}$$

The item and the number of occurrences corresponding to the list element x are written as a(x) and f(x), respectively.

For example, an open address type hash table (such as a linear hash table) (Non Patent Literature 2) is regarded as such a list. A prioritized queue and an array can also be regarded as the list.

The method described below performs update as in Expressions 5 when one item a is included in a plurality of lists (see Expression 4).

[Math. 4]

$$(a, f_j) \in T^j (j=j_1, \ldots, j_k) \tag{Expression 4}$$

$$(a, f_{j_1} + \ldots f_{j_k}) \in T^{j_1},$$

$$(a, 0) \in T^j (j=j_2, \ldots, j_k) \tag{Expressions 5}$$

Expressions 5 mean that elements of data structures formed by respective cores are compared for each item, the statistic values in the elements are brought together into any one element and the statistic values of the other elements is made zero. When update is performed in such a manner, it is possible to remove redundant elements among the data structures by ignoring elements having a frequency of occurrence of 0.

Specifically, the merging step S13 is performed as follows.
Step 1
First, an entire order among items is determined. Examples of the entire order include an order in which a bit sequence is regarded as a natural number. In the present embodiment, assume that work is performed in an ascending order of the destination address.
Step 2
Each of the $T^i$'s is sorted in the ascending order in accordance with the entire order determined in Step 1 (see Equation 6 and FIG. 5).

Figure 5:
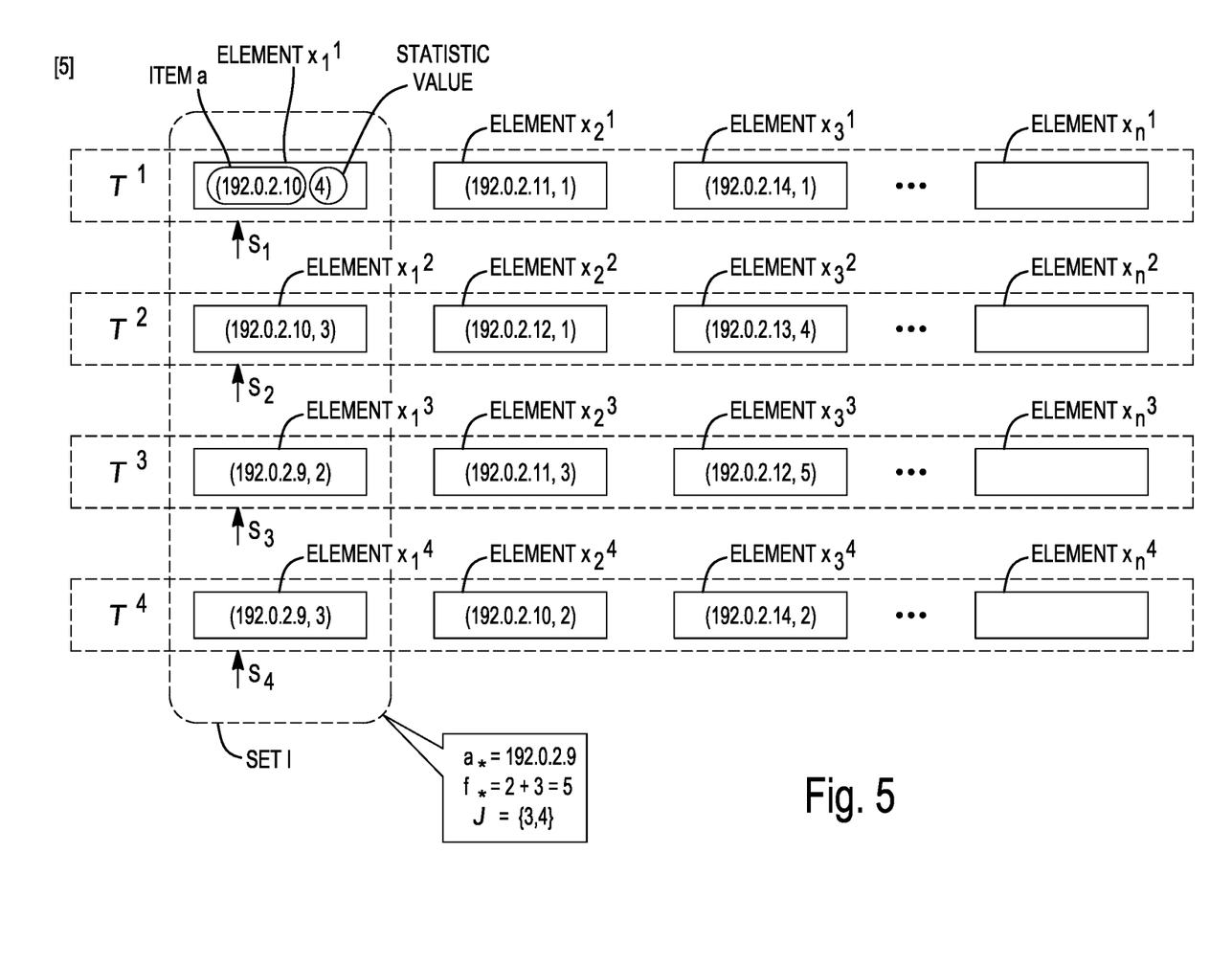
FIG. 5 is a diagram illustrating an operation of the traffic monitoring apparatus according to an embodiment of the present invention.

[Math. 6]

$$T^i = \{x_1^i, x_2^i, \ldots, x_{l_i}^i\} \tag{Equation 6}$$

Here, $l_i$ is the length of the list $T^i$.
Step 3
An element to be processed is selected in each list $T^i$.
For i=1, 2, . . . , n, Expression 7 is set.

[Math. 7]

$$s_i \leftarrow 1 \tag{Expression 7}$$

Here, $s_i$ is the number of the element x to be processed in the i-th list $T^i$ (the element can be expressed as "$x_{s_i}^i$"). That is, the first elements x to be processed are selected in each $T^i$, and their numbers $s_1$, $s_2$, $s_3$, $s_4$, . . . are set to 1.
Step 4
It is verified whether there is an element to be selected for all lists. I is a set of selected elements x.

[Math. 8]

$$I \leftarrow \{i \in \{1, 2, \ldots, n\} | s_i < l_i\} \tag{Expression 8}$$

Step 5
When I is an empty set, the processing ends.
Step 6
The smallest item among the selected elements is defined as a*.

[Math. 9]

$$a_* \leftarrow \min_{i \in J} a(x_{s_i}^i) \tag{Expression 9}$$

Figure 7:
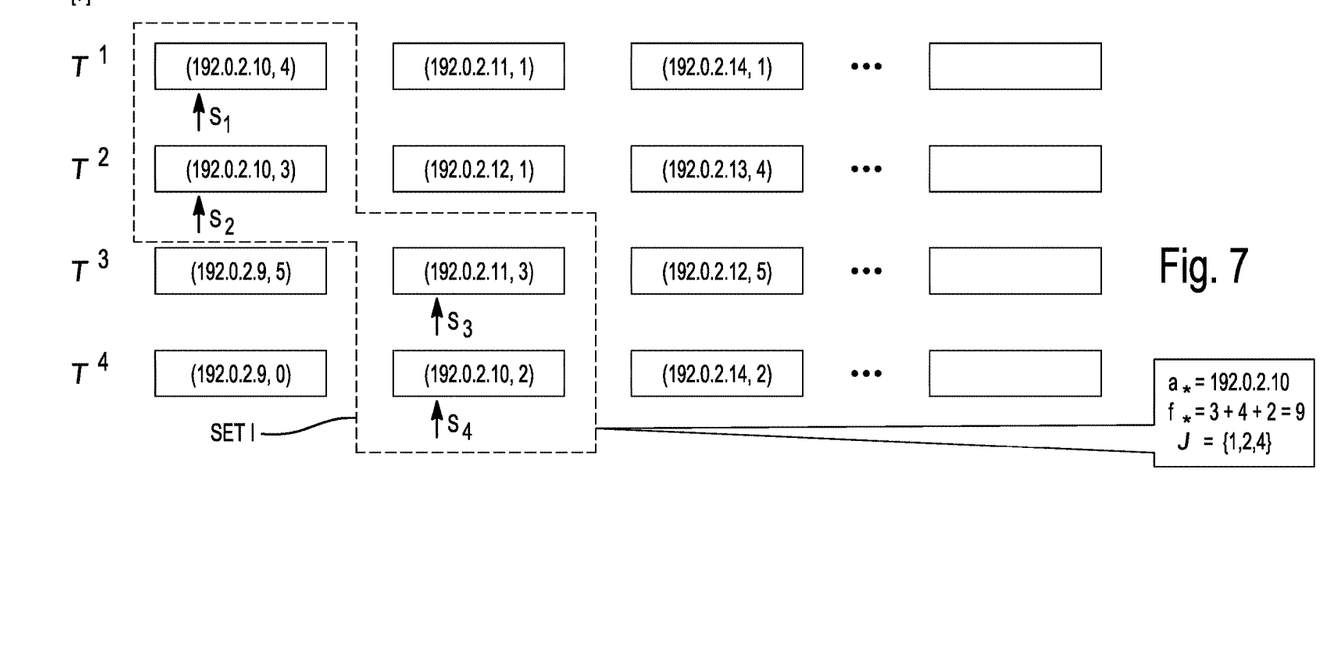
FIG. 7 is a diagram illustrating an operation of the traffic monitoring apparatus according to an embodiment of the present invention.
Figure 9:
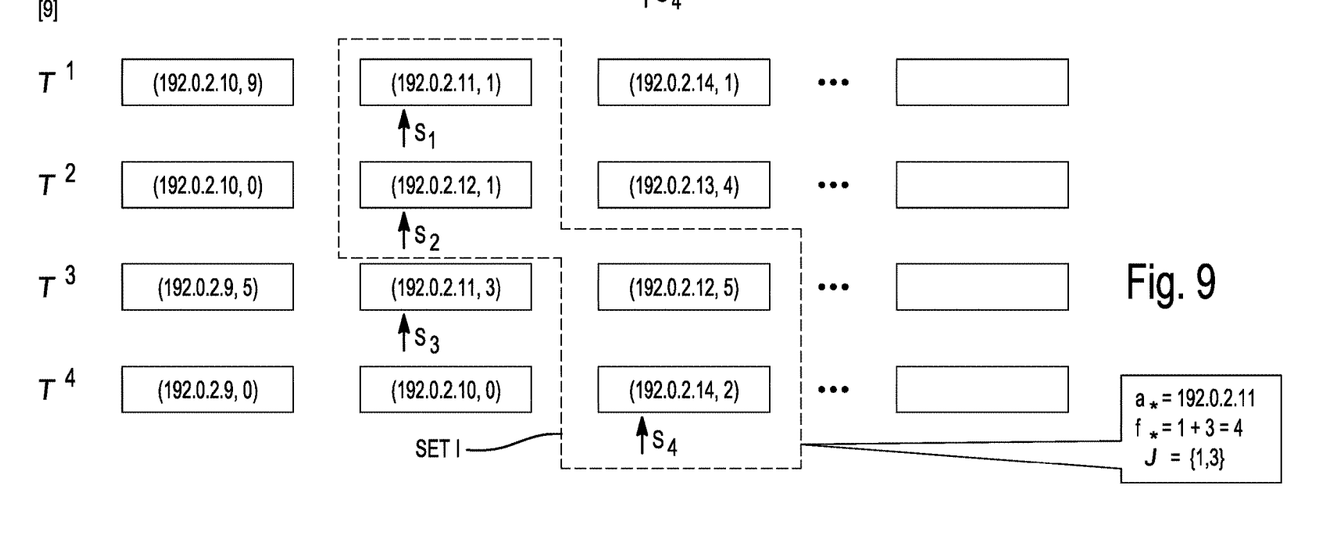
FIG. 9 is a diagram illustrating an operation of the traffic monitoring apparatus according to an embodiment of the present invention.

In the state illustrated in FIG. 5, a*=192.0.2.9 is established, in the state illustrated in FIG. 7, a*=192.0.2.10 is established, and in the state illustrated in FIG. 9, a*=192.0.2.11 is established.
Step 7
The numbers of elements to be processed (item a*) are found in the set I.

[Math. 10]

$$J \leftarrow \{j \in t | a_* = a(x_{s_j}^j)\} \tag{Expression 10}$$

In the case of FIG. 5, the elements to be processed are $s_3$ and $s_4$, and J is 3 and 4. In the case of FIG. 7, the elements to be processed are $s_1$, $s_2$, and $s_4$, and J is 1, 2, and 4. In the case of FIG. 9, the elements to be processed are $s_1$ and $s_3$, and J is 1 and 3.

Step 8
The statistic values of the elements to be processed are brought together. In the case of FIGS. 5, 7 and 9, the statistic value is the number of occurrences and thus the numbers of occurrences of the elements to be processed are added.

[Math. 11]

$$f_* \leftarrow \Sigma_{j \in J} f(x_{s_j}^j) \qquad \text{(Expression 11)}$$

Note that, as described above, the calculation formula of Expression 11 is different depending on types of statistic values.
Step 9
For each $j \in J$, the elements of the list are updated as in Expressions 12.

[Math. 12]

$$\text{If } j = \min J, \text{ then } f(x_{s_j}^j) \leftarrow f_*$$

$$\text{If } j \neq \min J, \text{ then } f(s_{s_j}^j) \leftarrow 0 \qquad \text{(Expressions 12)}$$

Figure 6:
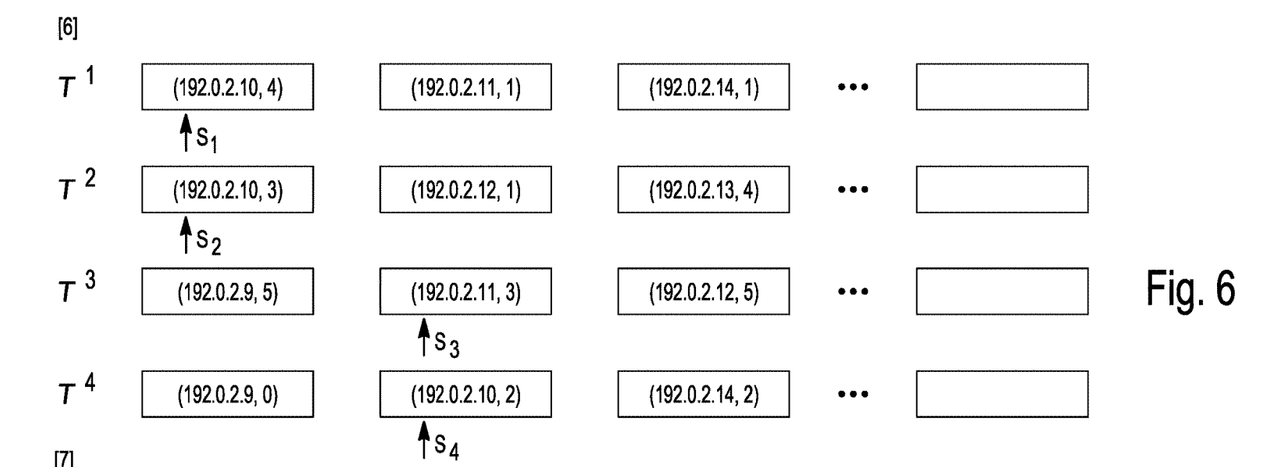
FIG. 6 is a diagram illustrating an operation of the traffic monitoring apparatus according to an embodiment of the present invention.
Figure 8:
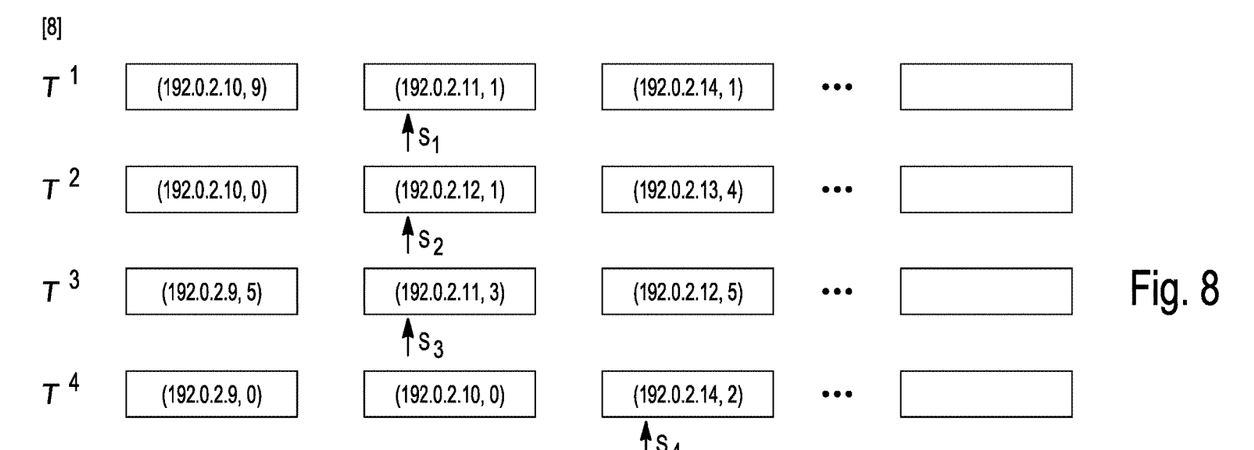
FIG. 8 is a diagram illustrating an operation of the traffic monitoring apparatus according to an embodiment of the present invention.

Specifically, among the elements to be processed, the statistic value of the element having the smallest number is replaced with the value recomputed in Step 8 and the statistic values of the other elements are replaced with zero. In the case of FIG. 5, $s_3$ and $s_4$ are to be processed, and thus the statistic value (number of occurrences) of the $s_3$ element is replaced from 2 to 5 and the statistic value (number of occurrences) of the $s_4$ element is replaced from 3 to 0. FIG. 6 illustrates the state after the statistic values have been replaced.
In the case of FIG. 7, $s_1$, $s_2$, and $s_4$ are to be processed, and thus the statistic value (number of occurrences) of the $s_1$ element is replaced from 4 to 9, and the statistic values (number of occurrences) of the $s_2$ and $s_4$ elements are replaced from 3 to 0 and 2 to 0, respectively. FIG. 8 illustrates the state after the statistic values have been replaced.
In the case of FIG. 9, $s_1$ and $s_3$ are to be processed, and thus the statistic value (number of occurrences) of the $s_1$ element is replaced from 1 to 4 and the statistic value (number of occurrences) of the $s_3$ element is replaced from 3 to 0.
Step 10
A similar operation is performed for the next item.
Expression 13 is set for each $j \in J$, and the processing is returned to Step 4.

[Math. 13]

$$s_j \leftarrow s_j + 1 \qquad \text{(Expression 13)}$$

It is not necessary to secure a new memory by using quick sorting (Non Patent Literature 2) or the like in the sorting in Step 2. Moreover, after sorting, it is only required to access each list in order from the top, so that the operation is completed at high speed.
If lists are sorted in parallel, the required computational complexity is as Expression 14.

[Math. 14]

$$o(\max_i |T^i| \log |T^i|) \qquad \text{(Expression 14)}$$

If lists cannot be sorted in parallel, the required computational complexity is as Expression 15.

[Math. 15]

$$o(\Sigma_{i=1}^n |T^i| \log |T^i|) \qquad \text{(Expression 15)}$$

APPENDIX

The following describes the traffic monitoring method of the present embodiment.
The present invention relates to a method of eliminating redundant elements and merging multiple n data structures constructed by observing traffic with multiple n cores, the method repeating a processing including sorting "elements x each composed of a combination of an item $a_j$ and the number $f_j$ of occurrences of the item $a_j$" in an ascending order based on a predetermined entire order of items $a_j$ for each list $T^i$ of a data structure observed by an i-th core (i is an integer of 1 or more and n or less), inspecting the elements x sequentially from the top of each list, calculating a sum of the numbers $f_j$ of occurrences in an element x for all lists $T^i$ including the element x composed of the same item $a_j$, and among lists $T^i$ including the element x, replacing the number of occurrences $f_j$ in the element x of a list $T^i$ having a smallest i with the sum of the numbers $f_j$ of occurrences and replacing all numbers $f_j$ of occurrences in the element x of the other lists $T^i$ with 0.
The present invention has the following three points.
(A) A data structure such as an open address type hash table, a prioritized queue, or an array can also be treated as a list.
(B) Lists can be sorted at high speed without securing a new memory by using quick sorting or the like.
(C) After sorting, lists can be merged by examining only the elements at the top of the lists rather than the entire lists.

EFFECTS

When a traffic is observed with a plurality of cores, it is necessary to merge a plurality of constructed data structures at high speed, but the present invention allows for faster merging of a plurality of data structures without reconstructing a data structure, retrieving a data structure, and adjusting the RSS function.

REFERENCE SIGNS LIST

11 Sorting unit
12 Core
13 Merging unit

The invention claimed is:
1. A traffic monitoring method in a multi-core environment, the traffic monitoring method comprising:
sorting packets into a plurality of cores with a receive side scaling (RSS) function;
in each of the plurality of cores, every predetermined time, observing the packets for items to obtain statistic values and forming a data structure composed of elements, each of the elements being composed of a combination of each of the items and each of the statistic values; and
comparing the elements composing the data structure formed in each of the plurality of cores for each of the items, rewriting a statistic value of the statistic values composing an element of the elements of any one of the plurality of cores to a value depending on a purpose of the statistic value for each of the items, replacing the statistic values composing the elements of other ones of the plurality of cores with zero, and merging a plurality of the data structures of the plurality of cores.

2. The traffic monitoring method according to claim 1, wherein
the statistic value composing the element is the number of occurrences of each of the packets corresponding to each of the items of the element, and
the value depending on the purpose of the statistic value is sum of the statistic values composing the elements of all the plurality of cores.

3. The traffic monitoring method according to claim 1, wherein
the statistic value composing the element is a packet length of each of the packets corresponding to each of the items of the element, and
the value depending on the purpose of the statistic value is sum of the statistic values composing the elements of all the plurality of cores.

4. The traffic monitoring method according to claim 1, wherein
the statistic value composing the element is a maximum packet length of each of the packets corresponding to each of the items of the element, and
the value depending on the purpose of the statistic value is a maximum value among the statistic values composing the elements of all the plurality of cores.

5. The traffic monitoring method according to claim 1, wherein
the statistic value composing the element is a minimum packet length of each of the packets corresponding to each of the items of the element, and
the value depending on the purpose of the statistic value is a minimum value among the statistic values composing the elements of all the plurality of cores.

6. The traffic monitoring method according to claim 1, wherein
at the predetermined time, the forming of the data structure is performed in one database of each of the plurality of cores and each of the plurality of the data structures where the merging is performed is stored in another database of each of the plurality of cores.

7. A non-transitory computer-readable medium having computer-executable instructions that, upon execution of the instructions by a processor of a computer, cause the computer to function as the traffic monitoring method described in claim 1.

8. A multi-core traffic monitoring apparatus comprising:
a processor; and
a storage medium having computer program instructions stored thereon, when executed by the processor, perform to:
sort packets in plural with a receive side scaling (RSS) function;
receive the packets sorted, observe the packets for items every predetermined time to obtain statistic values, and form a data structure composed of elements, each of the elements being composed of a combination of each of the items and each of the statistic values; and
compare the elements composing the data structure formed in each of the plurality of cores for each of the items, rewrite a statistic value of the statistic values composing an element of the elements of any one of the plurality of cores to a value depending on a purpose of the statistic value for each of the items, replace the statistic values composing the elements of other ones of the plurality of cores with zero, and merge a plurality of the data structures of the plurality of cores.

* * * * *